United States Patent [19]

Wilson

[11] 4,077,611

[45] Mar. 7, 1978

[54] FENCE WIRE MOUNT AND INSULATOR

[75] Inventor: Robert M. Wilson, Battle Creek, Mich.

[73] Assignee: Dare Products, Incorporated, Battle Creek, Mich.

[21] Appl. No.: 735,140

[22] Filed: Oct. 26, 1976

[51] Int. Cl.[2] .................... A01K 3/00

[52] U.S. Cl. .................... 256/10; 256/47; 174/163 F

[58] Field of Search .................... 256/10, 47, 48, 52; 174/158 F, 161 F, 163 F; 248/218.4

[56] References Cited

U.S. PATENT DOCUMENTS

| | | | |
|---|---|---|---|
| 2,609,418 | 9/1952 | Binns et al. | 248/218.4 X |
| 3,411,754 | 11/1968 | Fahrenholz | 256/48 |
| 3,652,780 | 3/1972 | Wilson | 174/163 F X |
| 3,654,383 | 4/1972 | Wilson | 174/163 F |
| 3,820,758 | 6/1974 | Berg et al. | 256/10 |

FOREIGN PATENT DOCUMENTS

| | | | |
|---|---|---|---|
| 804,183 | 1/1969 | Canada | 174/163 F |

*Primary Examiner*—Andrew V. Kundrat
*Attorney, Agent, or Firm*—Fisher, Gerhardt & Groh

[57] ABSTRACT

A fence wire mount and insulator device adapted for mounting on a metal fence post of T-shaped cross section in which wire is supported in spaced relationship relative to the fence post by a bracket member which engages the fence post and is shaped to accommodate a variety of configurations and dimensions. The bracket which engages the fence post is provided with a curved offset portion which permits elongation of one portion of the bracket and permits initial easy insertion of the fence post relative to the bracket.

8 Claims, 10 Drawing Figures

FENCE WIRE MOUNT AND INSULATOR

This invention relates to fence wire mounting and insulating devices and more particularly to such devices which are adapted for mounting on metal T-posts.

Fence wire mounting insulating devices are commonly made of plastic materials for mounting on a metal fence post to support electrically charged wires so that the wires are firmly supported in an elevated position and are well insulated from the metal posts and also are protected from shorting upon becoming wet during rain storms. Although the T-form of fence post is generally standardized by way of weight per linear unit of length, the actual dimensions of such sections vary substantially from manufacturer to manufacturer such that the major dimensions, that is, the width and depth vary as much as one eighth of an inch overall. Moreover, some forms of T-post have a ridge on the cross member in alignment with the leg member of the T and in still others, the cross member is curved. It becomes necessary that the same insulating device can be used with any of the available cross sections of post so that an inventory of different shapes is not required by either the manufacturer or by the user.

It also is highly desirable that such devices be made of a single unitary piece of material so that separate parts are not required and even more importantly that the device may be mounted on a T-post without necessitating the use of tools.

It is an object of the invention to provide a fence wire mounting and insulating device which is capable of quickly being mounted on a T-shaped fence post without the need for tools to assume a support position for receiving a charged wire of an electric fence.

It is another object of the invention to provide a device of this type which will accommodate variations in the cross-sectional configuration and overall dimensions of such T-shaped fence posts.

An additional object of the invention is to provide such a device in which the wire holding means are spaced from the bracket supported on the fence post and are separated by a flanged guard acting as a barrier to both water and electrically conductivity between the post and the wire.

A wire supporting and insulating device for holding a wire in electrically insulated relationship to a metal fence post is provided which may be attached to the fence post without the use of tools. The device includes a supporting bracket of general V-shaped configuration with hook portions at the ends of the legs of the V which engage edge portions of the T-shaped fence post. Wire holding fingers are supported in spaced relationship to the mounting bracket and a base member or protective guard is interposed between the wire holding fingers and the fence post to prevent arcing and water flow which would form an electrically conductive path between the current carrying wire and the grounded fence post. Modifications of the invention permit the support of the wire either at the front or back of a post and in spaced relationship to insulate the current carrying wire from established grounded wire already supported from the fence post.

Figure 1:
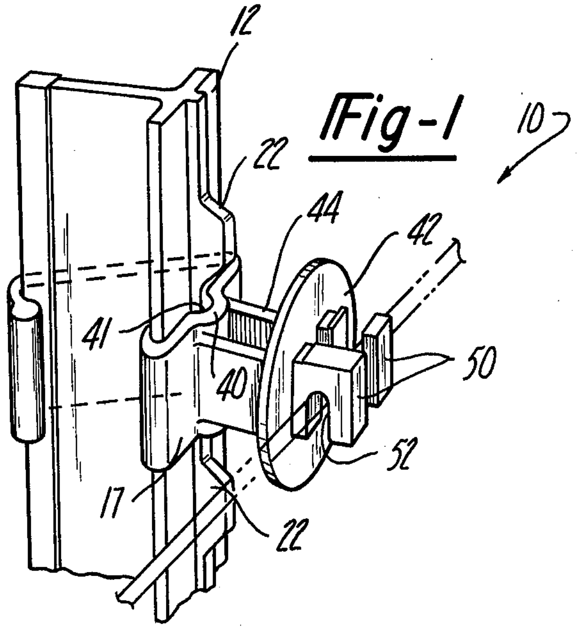
FIG. 1 is a perspective view showing the mounting and insulating device embodying the invention attached to a fence post.
Figure 2:
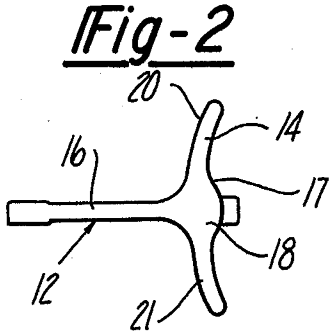
FIG. 2 is a cross-sectional view of one form of T-shaped fence post adapted to be used with the device.

Referring to the drawings and particularly to FIG. 1, the fence wire mounting and insulating device is designated generally at 10 and is shown mounted on a metal fence post 12 having a generally T-shaped cross section. The fence post may have varying cross sections ranging from that shown in FIG. 2 to that shown in FIG. 3. Referring particularly to FIG. 2, the T-shaped fence post 12 has a cross or head member 14 which is intersected by the upright or leg member 16 of the T. The face or top surface 17 of the cross member 14 is provided with a flange 18 in alignment with the leg member 16. In the arrangement in FIG. 3, the flange 18 protrudes from the plane of face 17 of the cross member 14. However, in FIG. 2 the face 17 is angled and the outer surface of flange 18 and the ends 20 and 21 of the cross member 14 are in the same common plane. The mounting and insulating device 10 must be able to conform to posts with both of these and other cross sections in order to be of the greatest utility.

The flange 18 of the fence posts 12 is provided with a plurality of uniformly spaced positioning lugs 22 which are common to commercially available T-shaped fence posts.

The wire mounting and insulating device 10 is adapted to be mounted on a post 12 between lugs 22 which limit relative vertical movement of the device 10 and post 12.

Figure 4:
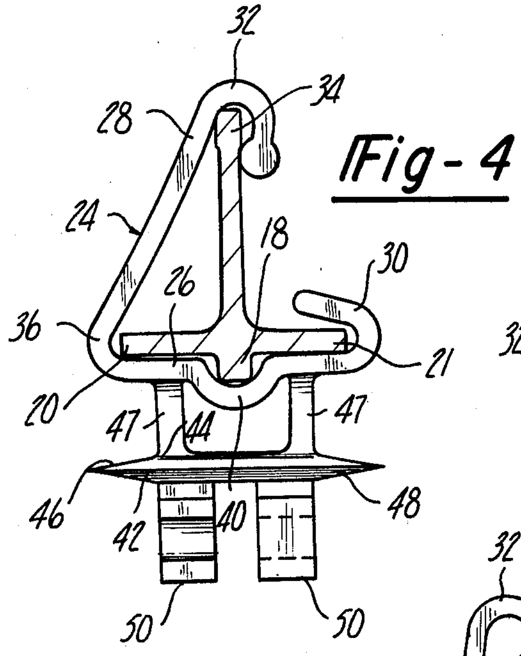
FIG. 4 is a top view, with the fence post in section, showing the attaching device supported on the post.

The device 10 includes a V-shaped support bracket 24 having a pair of diverging legs 26 and 28. The end of the leg 26 is provided with a hook 30, which as seen in FIG. 4, is adapted to be positioned around one end 21 of the cross bar 14. The other leg 28 is provided with a hook element 32 which is adapted to pass around the rearward edge 34 of the leg 16. The apex 36 of the angle formed between the legs 26 and 28 is intended to be positioned adjacent the other end 20 of the cross member 14 of the T-shaped post.

Figure 3:
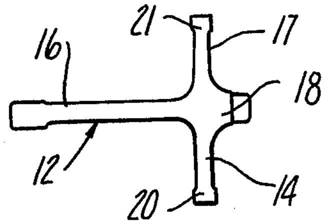
FIG. 3 is a cross-sectional view similar to FIG. 2 showing another form of cross section of fence post.

The leg 26 is provided with an offset, curved portion 40 intermediate the hook element 30 and the apex 36 which forms a groove or recess 41 affording a clearance for the flange 18 in the event that the cross member 14 is straight, that is, the fence post has a cross-sectional shape such as that seen in FIG. 3.

A base member or flange 42 is supported in spaced relationship to the leg 26 by a U-shaped support member 44 which merges with and is formed integrally with the rear face 46 of the flange 42. The ends of legs 47 of support 44 merge with the leg 26 at opposite sides of the offset, curved portion 40 to permit deflection of the leg 26 if necessary when attaching the device 10 to a post 12.

Figure 9:
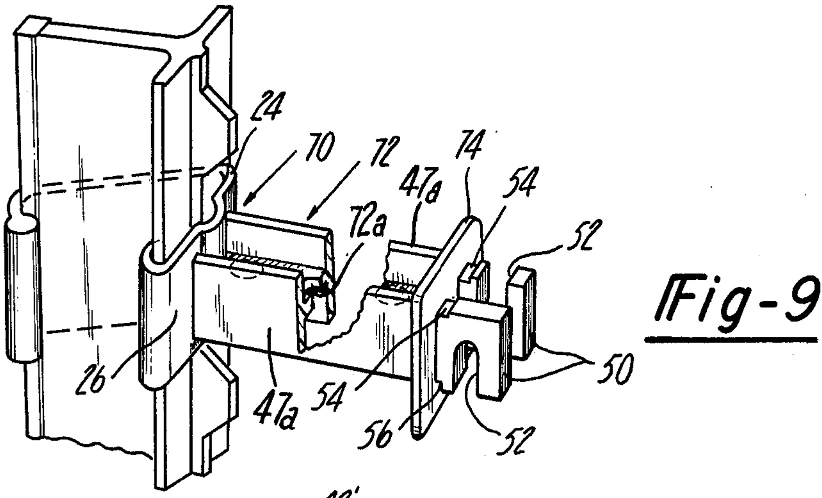
FIG. 9 is a view similar to FIG. 1 illustrating another embodiment of the invention.

The forward face 48 of the flange 42 is provided with a pair of wire support fingers 50. Each of the fingers 50 is generally U-shaped and is provided with a wire receiving slot 52. One slot 52 of one of the fingers 50 opens upwardly and the other slot 52 of the other finger opens downwardly so that one finger 50 limits vertical downward movement of a wire resting in the slot and the other finger 50 limits vertical upward movement of the wire. Each of the fingers 50 is provided with an upper grooe 54 and a lower groove 56 which is best seen in FIG. 9 adjacent to the front face 48 of flange 42. The upper slots 54 and lower slots 56 on the pair of fingers 50 are aligned with each other and serve to hold a wire which may be wound around the pair of fingers 50 rather than inserting the wire in the grooves or slots 52.

The spacing of the fingers 50 is at a distance to receive a section of wire vertically which when turned to a horizontal position will hold the wire in the slots 52 of the pair of fingers 50.

The bracket 24, support 44, flange 42 and fingers 50 are all formed integrally with each other in a single unit to form the device 10 which is preferably made of a high density polyethylene or other plastic material which will act as an insulator to electric current.

Figure 5:
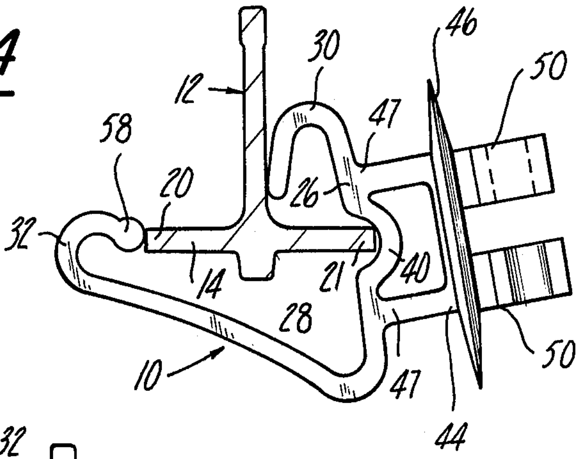
FIG. 5 shows another relative position of the mounting device and fence post during mounting of the device.

The wire mounting and insulating device 10 is attached to a fence post 12 to occupy the position shown in FIG. 4 by initially placing the device 10 in the position shown in FIG. 5 so that one end 21 of the cross member 14 is temporarily disposed in the groove formed by the offset portion 40 so that the other end 20 of the cross member 14 may pass the ball end 58 on the hook element 32. In other words, the spacing between the bottom of the groove of the offset portion 40 and the ball end 58 is substantially equal to the length of the head 14 or the distance between the ends 20 and 21.

Figure 6:
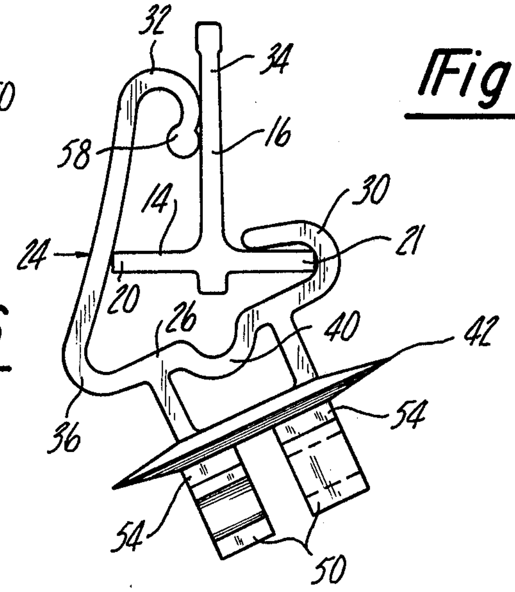
FIG. 6 is a view similar to FIG. 5 showing another relative position.
Figure 7:
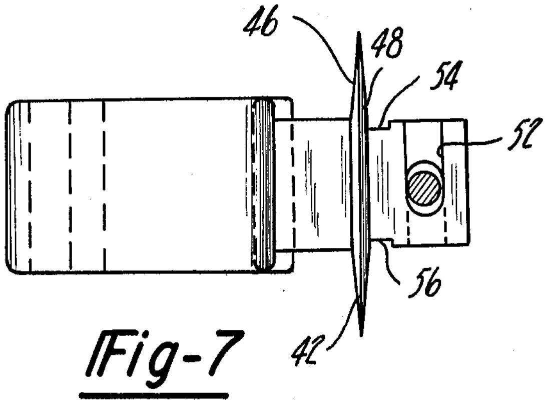
FIG. 7 is a side view of the wire support device looking axially of the wire.
Figure 8:
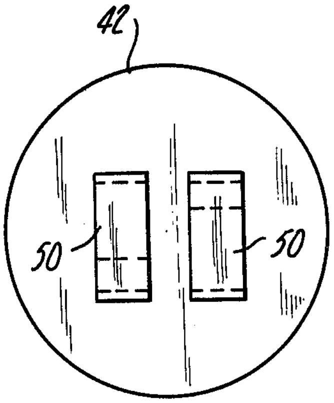
FIG. 8 is a front view of the arrangement seen in FIG. 7.

After the bracket 24 has been positioned as illustrated in FIG. 5, it may be rotated relative to the fence post until the bracket member 24 assumes the position relative to the post 12 illustrated in FIG. 6. In that position the hook 30 is disposed around the end 21 and the hook 32 is disposed to one side of the leg 16. The application of force on the leg 26 at the apex 36 in the direction of hook 32 will cause the legs 26 and 28 to flex relative to each other in the area of the apex 36 so that the ball or cam end 58 passes around the end of leg 16. Due to the resiliency of the materials, the hook element 32 will be pulled into position around the edge 34 of the leg and the bracket member 24 will be held against lateral displacement from the fence post 12. Vertical displacement is prevented by engagement of the device 10 with the spaced lugs 22 on the face 17 of the post 14.

With the mounting and insulating device in position on a post 12, wire is placed in the pair of finger members 50 by disposing a section of the wire vertically between the fingers 50. Thereafter, the section is rotated to a horizontal position so that opposite ends of the section enter the grooves 52 and the wire is disposed horizontally and transversely to the post 12. If desired and for the purpose of preventing axial movement of the wire it may be wrapped around the pair of fingers 50 in the grooves 54 and 56 seen in FIG. 9.

Referring to FIG. 9, another embodiment of the invention is shown in the form of a wire mounting and insulating device 70 which in this instance uses the same form of bracket member 24 as used with the device 10. In this instance the leg 26 is provided with an extension 72 which is substantially longer than the support 44 and includes leg members 47*a* maintained in spaced parallel relation by a web 72*a* and further reenforced, if desired, by a cross member, not shown, transverse to and intermediate the ends of both of the legs 47*a*. Extension 72 acts to hold fingers 50 in substantially spaced relationship to the face 17 of the post 12. In this instance the fingers 50 are attached to a base member 74 which can be smaller than the flange 42 since the spacing of the fingers 50 from the fence post 12 is sufficient to prevent any arcing between a bare electrical conductor disposed in the fingers 50 and a grounded fence post 12. The purpose of the extension 72 is to hold the wire conductor in a relatively large spaced apart relationship to the post 12. This is of particular utility when an existing woven fence or the like is supported by posts 12. Often after such fences have fallen into disrepair or for the purpose of making a temporary repair to such fences, it is desirable to support electrically charged wires of a fence charging system so that the electrical conductor does not become grounded by the existing fence.

Figure 10:
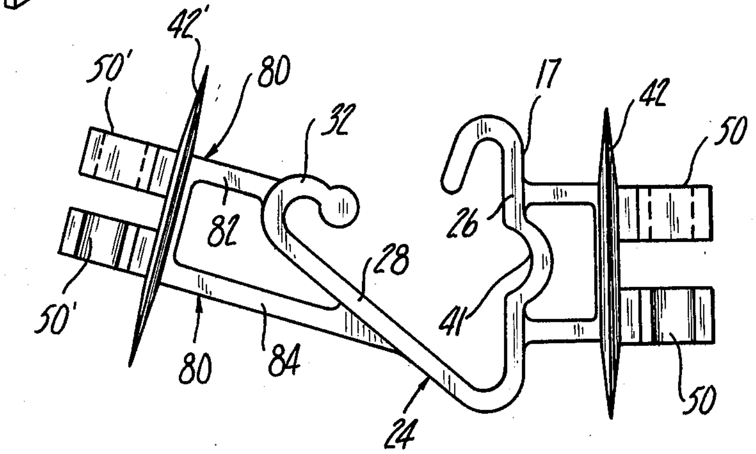
FIG. 10 is a view of a supporting and insulating device illustrating still another embodiment of the invention.

In some instances it becomes desirable to have the wire disposed on the rear of the post rather than at the face 17 of the post 12. In that case, as best seen in FIG. 10, a flange 42' and wire holding fingers 50' may be disposed by means of a bracket member 80 having legs or struts 82 and 84 formed integrally with the hook element 32 and leg 28, respectively. If desired, a flange 42 and wire holding fingers 50 may also be supported from the leg 26 in the same manner as with the device 10 seen in FIG. 1. The utility of the device seen in FIG. 10 is of particular importance when it is necessary to maintain the electrical conductor wire at one side of all of the posts but adjacent posts have their faces 17 facing in opposite directions.

All of the devices are attached in the same manner with the leg 26 of the bracket 24 at the face of the post. The groove portion 41 is of particular utility to permit the elongation of leg 26 if necessary. Also, the bracket member 24 can be moved into an initial position relative to the post 12 without distortion of the insulating devices and with certain configurations of posts as seen in FIG. 4, the groove 41 receives the forward protruding flange 18 and prevents distortion of the facing leg member 26.

A fence wire mounting and insulating device has been provided which is particularly adapted for mounting on metal T-shaped posts in such a manner that the devices may be readily attached to the post without use of tools. The devices are shaped to accommodate a wide variety of variations in the T-shaped cross sections of fence posts. One portion of the device is provided with an offset groove which not only accommodates a flange on the face of some T-posts but also permits elongation of one portion of the bracket member to facilitate attaching to a fence post. Also, the offset portion permits the relative positioning of the device and a fence post in the initial stages of attachment of the device so that unwarranted distortion of the device is not required.

The embodiments of the invention in which an exclusive property or privilege is claimed are defined as follows:

1. An electric fence wire mount and insulator device of plastic material adapted for detachable mounting on a metal fence post having a generally T-shaped cross section with a head member and an intersecting leg member comprising; a V-shaped support bracket with a pair of diverging legs having the apex of said support bracket adapted to be positioned adjacent one edge portion of the head member of a fence post, a first hook element formed at a free end of one leg of said V-shaped bracket for encompassing the other edge portion of said head member, a second hook member formed at the free end of the other of said legs of said V-shaped support bracket for engagement with an edge of the free end of the leg member of said T-shaped cross section, said one leg of said V-shaped support bracket having a curved portion protruding outwardly from said post and forming a recess intermediate the apex and the first hook element, and the spacing from the surface at the end of said second hook member to the botten of said recess is approximately equal to the spacing between the free ends of said head portion for easy insertion of said device on said fence post, a base member supported on said support bracket, and a pair of spaced wire support fingers formed integrally on said base at a side of the latter opposite to said support bracket said V-shaped bracket being adapted for detachable connection to said post with said base supporting an electric fence wire generally horizontally in transverse and electrically insulated relationship to said post.

2. The combination of claim 1 in which each of said wire support fingers form opposed grooves adjacent to said base member for receiving a wire wrapped around said support fingers.

3. The combination of claim 1 in which said second hook member is formed with a cam surface at the end of said hook for guiding said hook around the free edge of said leg member of said fence post upon attachment of said device to said fence.

4. The combination if claim 1 in which said pair of wire support fingers are generally U-shaped elements with the open end of one U-element facing upwardly and the open end of the other U-element facing downwardly and said support fingers being transversely spaced apart a distance slightly wider than the wire to be supported to receive a vertically extending wire portion for movement into the open ends of said U-elements.

5. The combination of claim 1 in which said base is supported by a pair of struts extending from said base member at opposite sides of said curved portion of said one leg to maintain flexibility of the latter.

6. The combination of claim 1 in which the spacing between said base member and said support bracket is greater than the major cross-sectional dimension of said fence post.

7. The combination of claim 1 in which a second base member is formed integrally with said support bracket.

8. A fence wire mount and insulator device of plastic material adapted for mounting on a metal fence post having a generally T-shaped cross section with a head member and an intersecting leg member comprising; a V-shaped support bracket with a pair of diverging legs having the apex of said support bracket adapted to be positioned adjacent one edge portion of the head member of a fence post, a first hook element formed at a free end of one leg of said V-shaped bracket for encompassing the other edge portion of said head member, a second hook member formed at the free end of the other of said legs of said V-shaped support bracket for engagement with an edge of the free end of the leg member of said T-shaped cross section, said one leg of said V-shaped support bracket having a curved portion protruding outwardly from said post and forming a recess intermediate the apex and the first hook element, a base member supported on said support bracket, and a pair of spaced wire support fingers formed integrally on said base at a side of the latter opposite to said support bracket to support a wire generally horizontally and in transverse relationship to said post, said base member being supported from said support bracket adjacent to said second hook member.

* * * * *

UNITED STATES PATENT AND TRADEMARK OFFICE

CERTIFICATE OF CORRECTION

PATENT NO. : 4,077,611

DATED : March 7, 1978

INVENTOR(S) : Robert M. Wilson

It is certified that error appears in the above-identified patent and that said Letters Patent are hereby corrected as shown below:

Column 3, line 12, "grooe" should read --groove--

Column 5, line 14, "botten" should read --bottom--

Signed and Sealed this

*Fourth* Day of *July 1978*

[SEAL]

*Attest:*

RUTH C. MASON
*Attesting Officer*

DONALD W. BANNER
*Commissioner of Patents and Trademarks*